(12) United States Patent
Choi

(10) Patent No.: US 6,501,517 B1
(45) Date of Patent: Dec. 31, 2002

(54) OPTICAL SYSTEM IN PROJECTION TELEVISION RECEIVER

(75) Inventor: Jae-Young Choi, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 29 days.

(21) Appl. No.: 09/624,547

(22) Filed: Jul. 24, 2000

(30) Foreign Application Priority Data

Jul. 24, 1999 (KR) .............................. 99-30247

(51) Int. Cl.⁷ ................................ H04N 5/74
(52) U.S. Cl. ................. 348/778; 348/776; 348/779; 348/781
(58) Field of Search ................ 348/745, 746, 348/747, 750, 770, 776, 778, 779, 780; H04N 5/74, 3/22, 9/31

(56) References Cited

U.S. PATENT DOCUMENTS

| | | | | |
|---|---|---|---|---|
| 3,969,648 A | * | 7/1976 | Hergenrother et al. | 348/778 |
| 4,870,321 A | * | 9/1989 | Kamohara | 313/414 |
| 4,883,438 A | * | 11/1989 | Hernqvist | 445/5 |
| 5,091,673 A | * | 2/1992 | Shimoma et al. | 313/412 |
| 5,382,883 A | * | 1/1995 | Chen et al. | 315/368.15 |
| 5,663,774 A | * | 9/1997 | Baik | 348/779 |
| 5,726,719 A | * | 3/1998 | Tanaka et al. | 349/8 |

* cited by examiner

*Primary Examiner*—John Miller
*Assistant Examiner*—Trang U. Tran
(74) *Attorney, Agent, or Firm*—Sughrue Mion, PLLC

(57) ABSTRACT

An optical system in a projection television receiver includes: a screen for simultaneously displaying R (Red), G (Green) and B (Blue) images thereon; and a light source part comprising R, G and B cathode ray tubes. The R and B cathode ray tubes project the R and B images on the screen via a reflecting mirror, whereas the G cathode ray tube is set together with the R and B cathode ray tubes in a delta type array and projects the G image directly on the screen.

1 Claim, 4 Drawing Sheets

OPTICAL SYSTEM IN PROJECTION TELEVISION RECEIVER

PRIORITY

This application claims priority to an application entitled "Optical System in Projection Television Receiver" filed in the Korean Industrial Property Office on Jul. 24, 1999 and assigned Serial No. 99-30247, the contents of which are hereby incorporated by reference.

BACKGROUND OF THE INVENTION

1. Field of the Invention

The present invention relates generally to an optical system in a projection television receiver and, more particularly, to an optical system in a projection television receiver in which R, G and B cathode ray tubes are arranged in a delta type array with a view to facilitating control of convergence.

2. Description of the Related Art

Unlike general televisions, the projection television receiver has three cathode ray tubes (CRTs) for red (R), green (G) and blue (B) colors and enlarges an image formed on the R, G and B CRTs through an optical system comprised of a plurality of reflecting mirrors and lenses, thereby displaying the enlarged image on a large-sized screen.

FIGS. 1 and 2 are diagrams illustrating the operational principle of an optical system in the related art projection television receiver and an array of R, G and B CRTs. Images each projected from R, G and B CRTs 100, 102 and 104 are enlarged at lens parts 106, 108 and 110, reflected by a reflecting mirror 112 and displayed on a screen 114. In the related art projection television receiver, as shown in FIG. 2, the R, G and B CRTs 100, 102 and 104 are arranged in a straight line with respect to the screen 114, i.e., the G CRT 102 is at the center of the screen 114, with the R and B CRTs 100 and 104 being positioned on the left and right sides, respectively, thereof. As the image projected on the screen 114 from the R or B CRT 100 or 104 has an excessively large angle of projection with respect to the image from the G CRT 102, as shown in FIG. 3, the images are out of accord with one another on the screen and thus the images are distorted. Such distortion of the image intensifies at the edges of the screen 114.

FIG. 4 shows distorted R, G and B images displayed on the screen due to straight arrangement of the CRTs. It is shown in FIG. 4 that distortion of the R, G and B images 400, 402 and 404 appear more significant on the left and right sides of the screen 114.

The related art projection television receiver, to overcome such a distortion problem, controls the convergence to make the images projected from the respective CRTs converged on a screen. However, compensation for the distortion of an image on the screen that results from the convergence control has a limitation and an excessive convergence control may incur an overload due to saturation of a power level.

SUMMARY OF THE INVENTION

It is, therefore, an object of the present invention to provide an optical system in a projection television receiver for facilitating control of convergence.

To achieve the above object, there is provided an optical system in a projection television receiver including: a screen for simultaneously displaying R (Red), G (Green) and B (Blue) images thereon; and a light source part comprising R, G and B cathode ray tubes. The R and B cathode ray tubes project the R and B images on the screen via a reflecting mirror, with the G cathode ray tube being set together with the R and B cathode ray tubes in a delta type array and projecting the G image directly on the screen.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described below with reference to the accompanying drawings. In the following description, well-known functions or constructions are not described in detail since they would obscure the invention in unnecessary detail.

Figure 5:
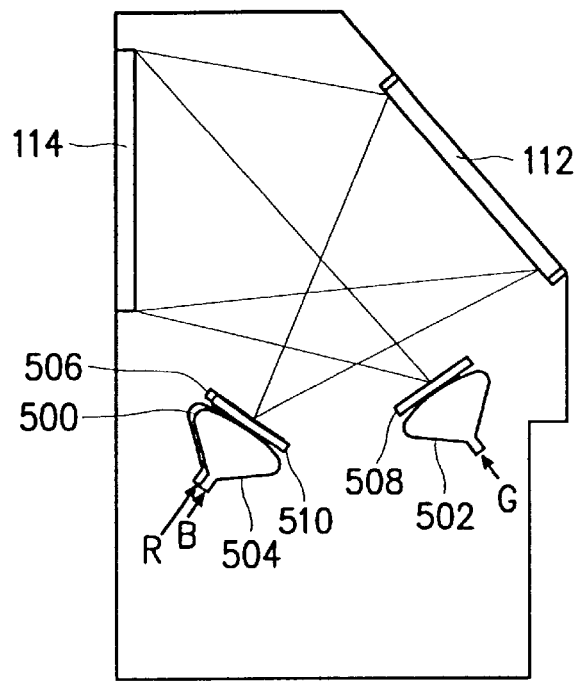
FIG. 5 is a schematic diagram of an optical system in a projection television receiver according to an embodiment of the present invention.
Figure 6:
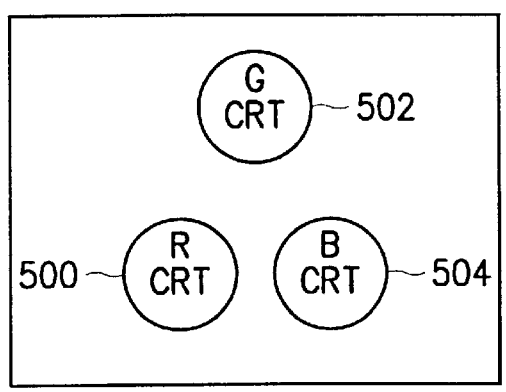
FIG. 6 is a diagram showing arrangement of R, G and B CRTS in the optical system according to an embodiment of the present invention.

FIG. 5 is a diagram illustrating operation of an optical system in a projection television receiver according to an embodiment of the present invention, and FIG. 6 is a diagram showing arrangement of R, G and B CRTS in the optical system.

Referring to FIG. 6, unlike the related art R, G and B CRTs 100, 102 and 104 arranged in a straight line with respect to the screen 114, R, G and B CRTs 500, 502 and 504 according to the embodiment of the present invention are set in a delta type array with respect to the screen 114. That is, the G CRT 502 is arranged at the rear side of the projection television receiver and the R and B CRTs 500 and 504 are adjacent to each other and arranged in a line at the center (or inward) of the screen 114.

Now, with reference to FIG. 5, a detailed description will be given to operation of the optical system in the projection television receiver with the R, G and B CRTs 500, 502 and 504 in a delta type array as shown in FIG. 6.

Figure 7:
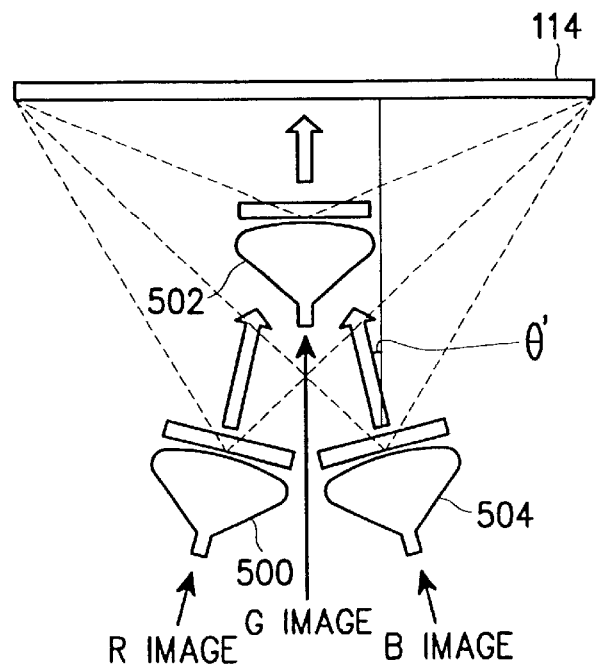
FIG. 7 is a diagram showing an angle of projection on a screen with the R, G and B CRTs in a delta type array according to the embodiment of the present invention.

Images each projected from the R and B CRTs 500 and 504 are enlarged at lens parts 506 and 510, reflected by a reflecting mirror 112 and displayed on a screen 114. In the projection television receiver according to the embodiment of the present invention, as shown in FIG. 6, the R and B CRTs 500 and 504 in a delta type array are located at the center of the screen 114, compared to the conventional R and B CRTs 100 and 104 in a straight line. Thus, as shown in FIG. 7, the images projected on the screen 114 from the R, G and B CRTs set in a delta type array have a projection angle θ' smaller than the conventional projection angle θ. Meanwhile, the G CRT 502 is arranged at the rear side of the optical system in the projection television receiver, as shown in FIGS. 5 and 6, and the image from the G CRT 502 is directly projected on the screen 114 without passing through the reflecting mirror 112.

Figure 1:
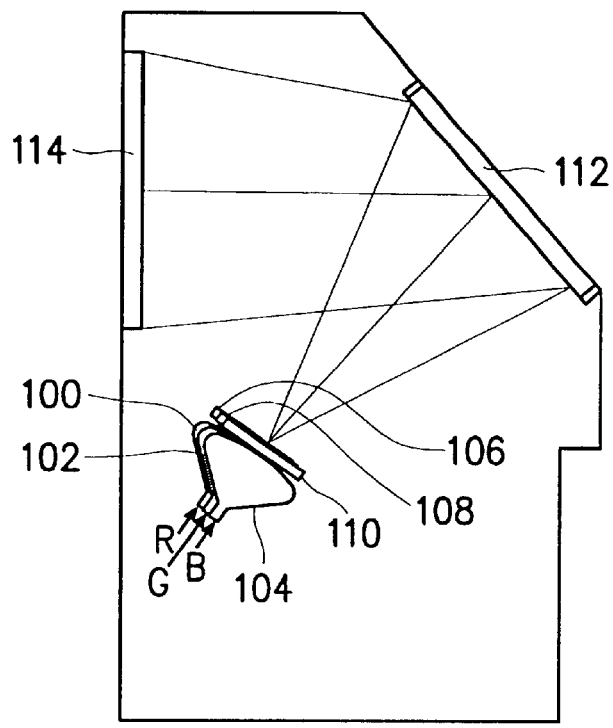
FIG. 1 is a schematic diagram of the related art optical system in a projection television receiver.
Figure 2:
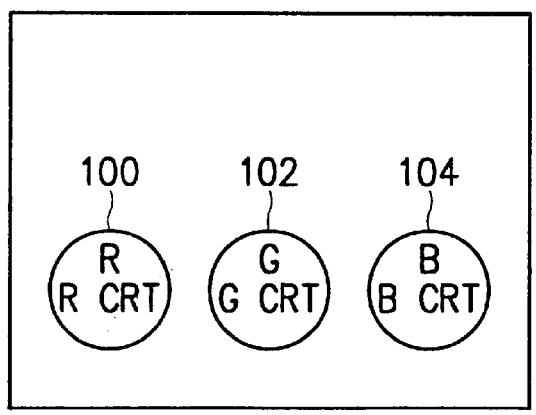
FIG. 2 is a diagram showing arrangement of R, G and B CRTs in the related art optical system.
Figure 3:
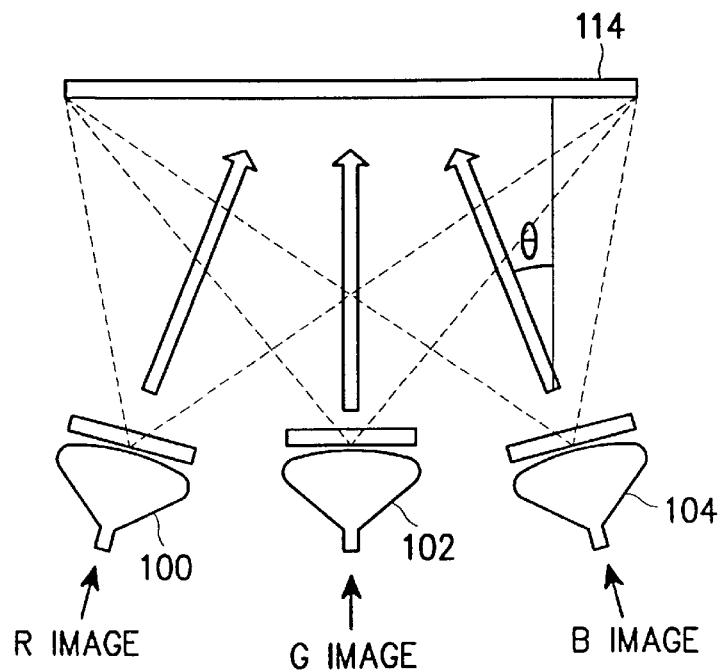
FIG. 3 is a diagram showing an angle of projection on a screen with the R, G and B CRTs arranged in a straight line in prior art.
Figure 4:
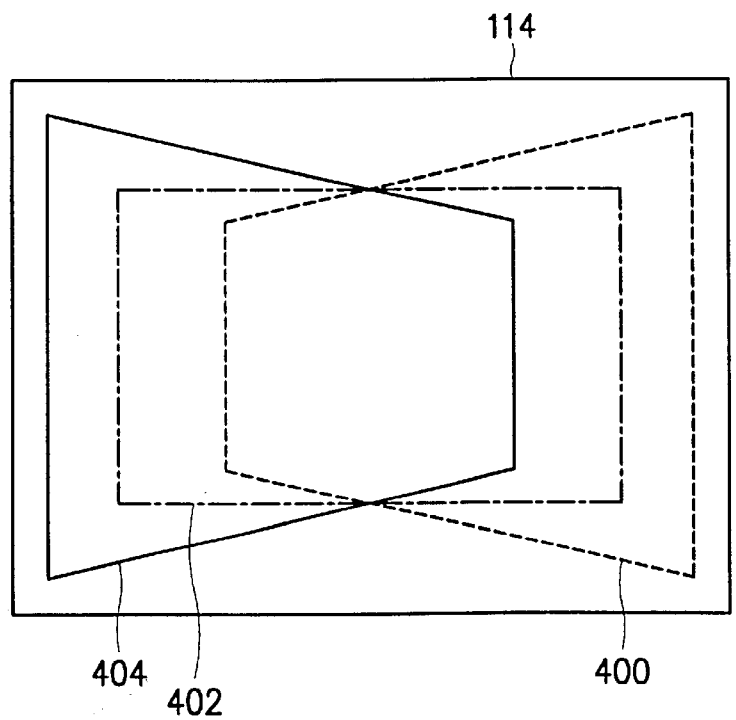
FIG. 4 is a diagram showing an example of distorted R, G and B images displayed on the screen with the R, G and B CRTs arranged in a straight line in prior art.
Figure 8:
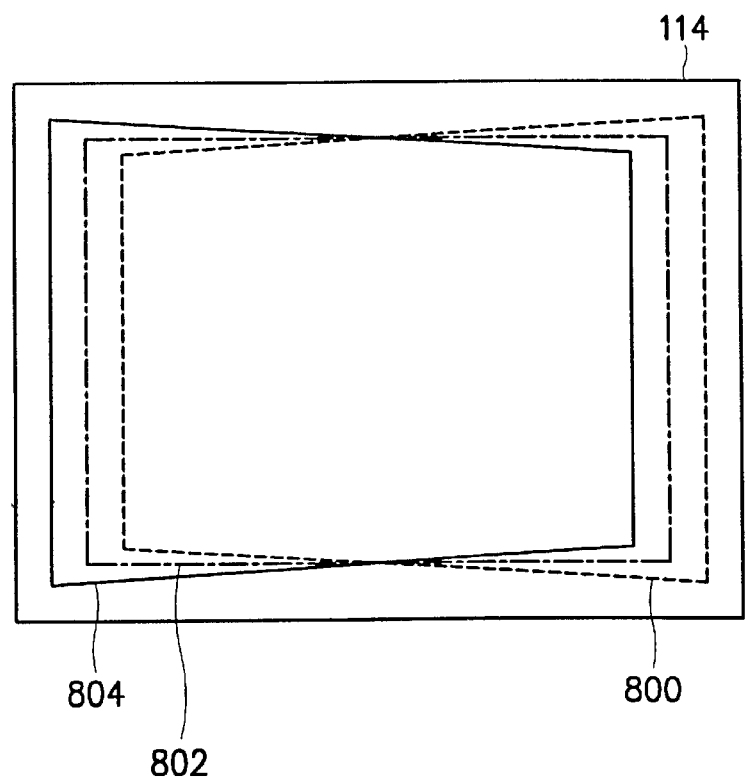
FIG. 8 is a diagram showing an example of distortion-compensated R, G and B images with the R, G and B CRTs in a delta type array according to the embodiment of the present invention.

It is shown in FIG. 4 that distortion of the R, G and B images 400, 402 and 404 is intensified on the left and right sides of the screen 114 because the R, G and B CRTs are arranged in a straight line. FIG. 8 shows the distortion-compensated R, G and B images on the screen with the R, G and B CRTs set in a delta type array. It can be seen from FIG. 8 that the R, G and B images 800, 802 and 804 projected on the screen 114 from the R, G and B CRTs 500, 502 and 504 in a delta type array are much more distortion-compensated, as compared to the R, G and B images 400, 402 and 404 projected from the conventional R, G and B CRTs arranged in a straight line.

Therefore, distortion of the image is compensated with the delta type array of the R, G and B CRTs of the optical system in the projection television receiver, as a result of which control of convergence can be facilitated.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical system in a projection television receiver, comprising:

a screen for simultaneously displaying R (Red), G (Green) and B (Blue) images thereon; and a light source part comprising R, G and B cathode ray tubes, the R and B cathode ray tubes projecting the R and B images on the screen via a reflecting mirror, the G cathode ray tube being set together with the R and B cathode ray tubes in a delta array to project the G image directly on the screen.

* * * * *